United States Patent
Chen et al.

(10) Patent No.: US 9,430,521 B2
(45) Date of Patent: Aug. 30, 2016

(54) QUERY EXPANSION THROUGH SEARCHING CONTENT IDENTIFIERS

(75) Inventors: Zheng Chen, Beijing (CN); Gang Wang, Beijing (CN); Jian-Tao Sun, Beijing (CN); Xiaochuan Ni, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 1592 days.

(21) Appl. No.: 12/570,948

(22) Filed: Sep. 30, 2009

(65) Prior Publication Data

US 2011/0078193 A1 Mar. 31, 2011

(51) Int. Cl.
*G06F 17/30* (2006.01)

(52) U.S. Cl.
CPC ... *G06F 17/30392* (2013.01); *G06F 17/30572* (2013.01)

(58) Field of Classification Search
CPC .... G06F 17/5081; G06F 19/00; G06F 9/465; G06F 17/30572; G06F 17/30654
See application file for complete search history.

(56) References Cited

U.S. PATENT DOCUMENTS

| | | | |
|---|---|---|---|
| 6,094,652 A * | 7/2000 | Faisal | |
| 7,092,936 B1 | 8/2006 | Alonso et al. | |
| 7,158,966 B2 | 1/2007 | Brill et al. | |
| 7,257,766 B1 * | 8/2007 | Koppel et al. | 715/205 |
| 7,287,025 B2 | 10/2007 | Wen et al. | |
| 7,296,007 B1 * | 11/2007 | Funge | A63F 13/10 |
| | | | 345/156 |
| 7,426,497 B2 * | 9/2008 | Bacioiu | G06K 9/6262 |
| | | | 706/12 |
| 7,437,349 B2 * | 10/2008 | Basu et al. | |
| 2003/0055816 A1 * | 3/2003 | Paine et al. | 707/3 |
| 2006/0064411 A1 * | 3/2006 | Gross | G06F 17/30864 |
| 2008/0016050 A1 | 1/2008 | Stensmo | |
| 2008/0133585 A1 | 6/2008 | Vogel et al. | |
| 2008/0195596 A1 * | 8/2008 | Sisk | G06F 17/30864 |
| 2008/0215565 A1 | 9/2008 | Sun et al. | |
| 2010/0145975 A1 * | 6/2010 | Ratiner et al. | 707/765 |

OTHER PUBLICATIONS

Baeza-Yates et al., Query Recommendations Using Query Logs in Search Engines, Retrieved on Jul. 30, 2009, <<http://www.dcc.uchile.cl/~churtado/clustwebLNCS.pdf>>.
Riezler et al., "Statistical Machine Translation for Query Expansion in Answer Retrieval", Retrieved on Jul. 30, 2009, <<http://www.dcc.uchile.cl/~churtado/clustwebLNCS.pdf>>, Proceedings of the 45th Annual Meeting of the Association of Computational Linguistics, Jun. 2007, pp. 464-471.
Tsui at al., "Web Search Result Refinement by Document Clustering" Retrieved on Jul. 30, 2009, <<http://ieeexplore.ieee.org/stamp/stamp.jsp?arnumber=04413950 >>, IEEE, 2007, pp. 3081-3086.

* cited by examiner

*Primary Examiner* — Angelica Ruiz
(74) *Attorney, Agent, or Firm* — Sandy Swain; Lee & Hayes, PLLC; Micky Minhas

(57) ABSTRACT

Techniques and technologies for expanding a gallery by seeding the gallery with seed query results. A template is identified which is associated with the subjects of the seed queries and content identifiers are identified which include the template. These content identifiers are used to expand the gallery to include more content identifiers than before the expansion of the gallery.

20 Claims, 4 Drawing Sheets

QUERY EXPANSION THROUGH SEARCHING CONTENT IDENTIFIERS

BACKGROUND

Internet search engines compete with one another to attract users as measured by the number of unique visitors each search engine attracts and by the number of searches and/or clicks that the users collectively execute on those search engines. These metrics, and others, allow advertisers on the search engine web pages to rate the search engines and allow the owners thereof to collect revenue from the advertisers.

It goes without saying that most users prefer to use search engines which produce fast, accurate, and complete results. If a particular search engine executes slowly, users experience frustration and are prone to navigate to another search engine while their initial search appears to be stalled, "hung," or otherwise delayed. Moreover, if a search engine delivers query results which contain irrelevant information, the users also experience frustration as they navigate from one site to another without finding the information which they seek. Likewise, if the search engine delivers incomplete results the users (while perhaps never realizing that they possess incomplete search result) experience frustration as their search appears to have failed. Thus, they may find themselves trying many different search terms, different search engines, or giving up without locating the sought after information. Any combination of these, and other, problems may drive users from a search engine thereby diminishing the revenue stream which the search engine owner might otherwise earn.

SUMMARY

The following presents a simplified summary in order to provide a basic understanding of some aspects of the disclosed subject matter. This summary is not an extensive overview of the disclosed subject matter, and is not intended to identify key/critical elements or to delineate the scope of such subject matter. A purpose of the summary is to present some concepts in a simplified form as a prelude to the more detailed description that is presented later.

Techniques and technologies for expanding a gallery by seeding the gallery with seed query results. A template is identified which is associated with the subjects of the seed queries and content identifiers are identified which include the template. These content identifiers are used to expand the gallery to include more content identifiers than before the expansion of the gallery.

To the accomplishment of the foregoing and related ends, certain illustrative aspects are described herein in connection with the following description and the annexed drawings. These aspects are indicative of various ways in which the disclosed subject matter may be practiced, all of which are intended to be within the scope of the disclosed subject matter. Other advantages and novel features may become apparent from the following detailed description when considered in conjunction with the drawings.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

DETAILED DESCRIPTION

This document describes techniques and technologies for finding results for user queries and, more particularly techniques and technologies for expanding galleries which store query results.

Generally, this document discloses systems and methods for expanding galleries of query results thereby enabling better and faster network searches. Systems of embodiments include numerous client devices on which users enter their queries and receive the query results. These systems also include a server hosting a search engine application (hereinafter "search engine") and storing numerous galleries of query results. The client devices and server communicate through a network which can be the Internet and on which various network sites host content. The network sites and the various pieces of content are addressable via content identifiers such as uniform resource locaters (URLs).

Each gallery stores query results and content identifiers (i.e., gallery entries) regarding a particular subject of, in, or related to a category of the particular gallery. Thus, taken together, the galleries include entries directed toward numerous categories and, within each gallery, to numerous subjects. Galleries can be arranged in a hierarchy according to the various gallery categories. In addition, or in the alternative, the subjects within the galleries can be arranged in a hierarchy.

This document also discloses methods for expanding galleries which include query results (and other entries) and methods for searching networks for information. For instance, one method includes creating, organizing, and expanding a gallery as well as receiving user queries. The method of the current embodiment includes executing a search for the sought after information via a user query and mapping the results of that query to the gallery(s). Additionally, the method of the current embodiment includes returning such query results to the user.

Another method disclosed herein includes expanding a gallery of query results. The method of the current embodiment also includes collecting numerous content identifiers from a network and seeding a target gallery with query results for the seed queries. Furthermore, the current method includes searching the collected content identifiers twice. In one of those searches, a template is identified in the seed query results which is associated with the subjects of those seed query results. In the other search, the content identifiers are examined to determine which additional content identifiers also include the template. In addition, the current method includes expanding the gallery with these additional content identifiers.

Figure 1:
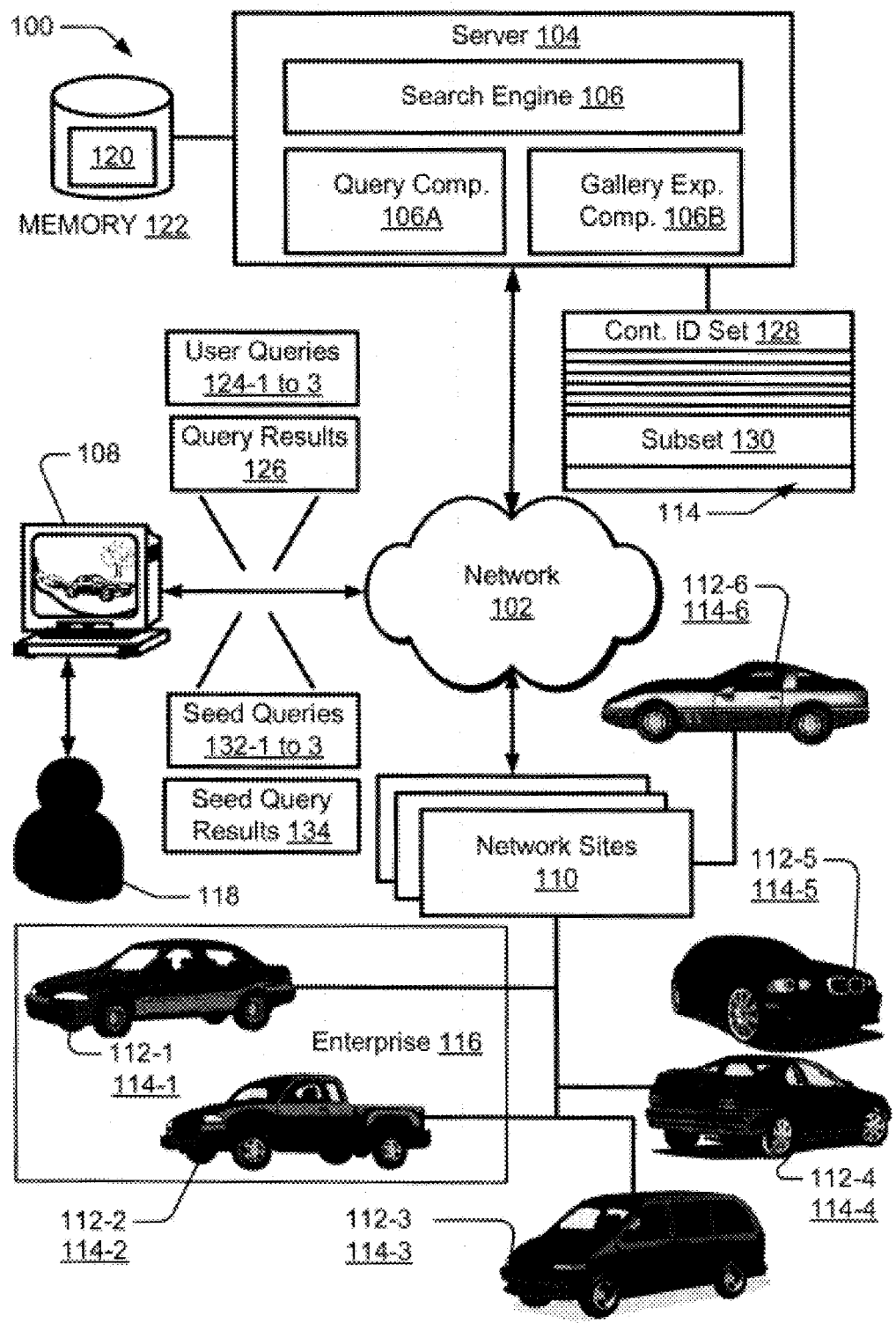
FIG. 1 is an illustrative schematic diagram of a system for conducting user queries on a network.

FIG. 1 is an illustrative schematic diagram of a system 100 for conducting user queries on a network. The system 100 includes a network 102, a server 104 which hosts a search engine 106, various client devices 108, and various network sites 110. The network sites 110 contain content regarding various subjects 112-1 to 6. Various content identifiers 114-1 to 6 identify these instances of content and provide logical locations on the network 102 where that content is located. While it can be the case that a one-to-one correspondence can exist between the network sites 110, the subjects 112, and the content identifiers 114, this condition does not always hold. Rather, the network sites 110, subjects 112, and content identifiers 114 can be organized in a variety of manners some of which change as desired by the owners or other users associated with these items. It might also be worth noting that the network 102 can be a local area network (LAN), a wide area network (WAN), the Internet, a distributed computing (or communications) network, or portions or combinations thereof. For instance, the network 102 could be that of some enterprise 116 such as a company or other organization.

Regardless of how the network 102 is organized, users 118 of the network 102 at times seek information from the network 102 regarding selected subjects 112. The users 118, however, might not know the logical locations of the information which they seek, whether that information exists, the subject to which it pertains, the particular pieces of content in which it might be found, etc. One way the users 118 overcome their lack of visibility into such issues is through using tools such as search engine 106 which locates, identifies, and links the users 118 to the content regarding the selected subjects 112. To perform these functions (and others) the search engine 106 maintains a collection of galleries 120 in a memory device 122 (for instance, a mass storage subsystem) and which contains the information which enables the functionality of the search engine 106. More particularly, the galleries 120 contain a collection of content identifiers 114 organized by subject 112 regarding the categories corresponding to the galleries 120. The memory device 122 also includes a computer readable medium storing executable instructions which when executed cause a processor (or other hardware) to instantiate and execute the search engine 106 and other functionality as disclosed herein.

Thus, with continuing reference to FIG. 1, to obtain information (i.e., content) regarding a subject 112, a user 118 creates a user query 124 and sends it to the search engine 106. The search engine 106 receives the user query 124 and determines the objective thereof (i.e., the subject or subjects 112 of which the user 118 is probably seeking information). Typically, a query component 106A of the search engine 106 identifies and searches the pertinent galleries 120 for pertinent entries regarding the objective of the user query 124. In addition, or in the alternative, the query component 106A can search the various network sites 110 for content related to the query objective to identify pertinent content identifiers 114. Moreover, a gallery expansion component 106B of the search engine 106 can update the gallery 120 with the content identifiers 114 which the query component 106A found on the network 102 while conducting various user queries 124. Regardless of how the search engine 106 of FIG. 1 obtains the content identifiers 114, the search engine 106 returns the pertinent content identifiers 114 to the user 118 (via the network 102 and client device 108) in a message or query result 126.

Figure 2:
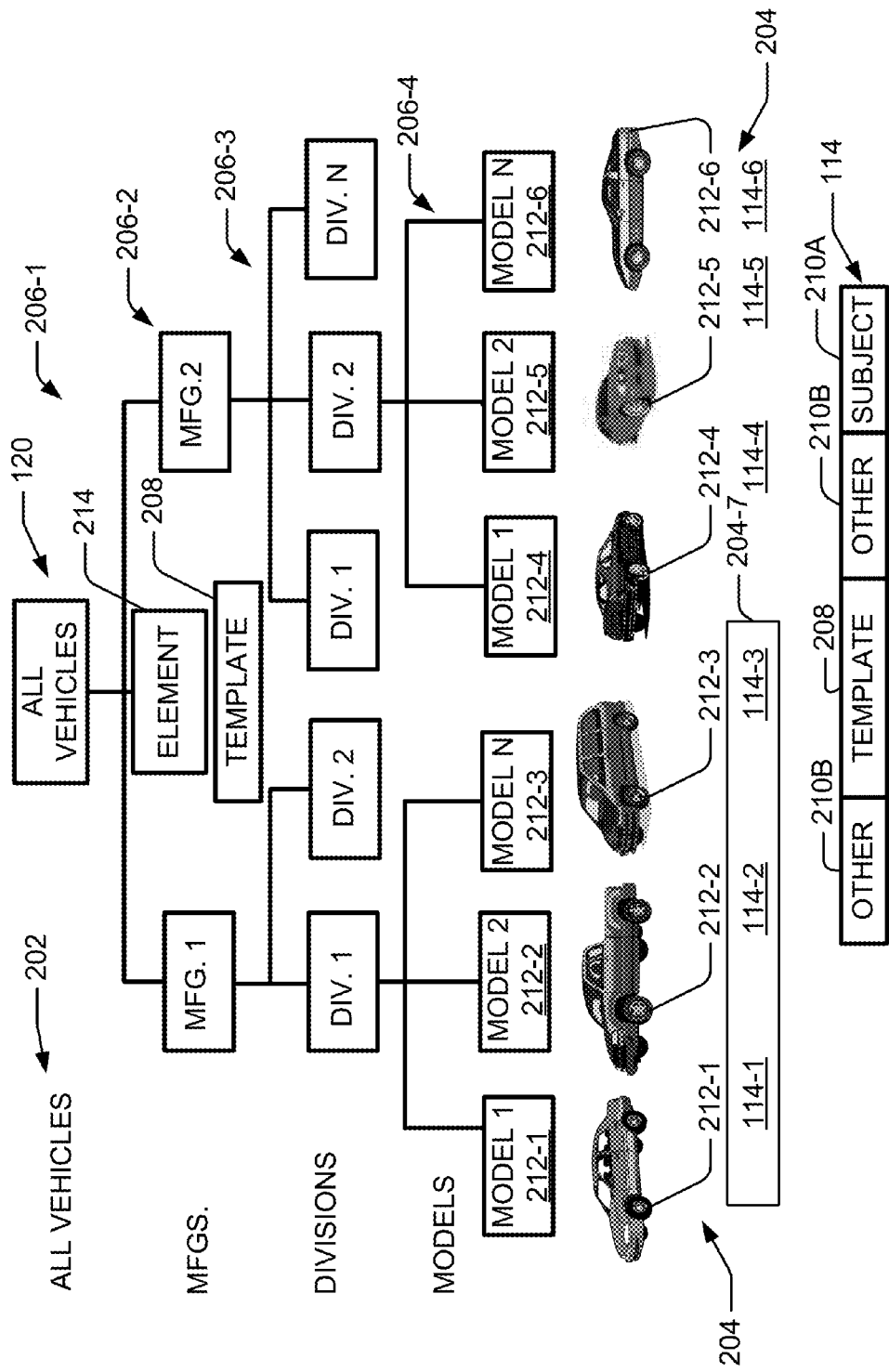
FIG. 2 is an illustrative block diagram of a gallery for query results.

It might be worth noting before discussing FIG. 2 that the network 102 typically includes numerous pieces of content with a corresponding number of content identifiers 114 associated therewith. Indeed, for a typical network 102, it is possible to collect a set 128, whether exhaustive or not, of the content identifiers 114 on the network 102. Moreover, some of the set 128 of content identifiers 114 will have some portion thereof in common. For instance, some content identifiers 114 will share a common root, path, directory, or portions or combinations thereof. Those content identifiers 114 with these common portions thus constitute a subset 130 of the set of content identifiers 114 on the network 102. In many situations, the set 128 of content identifiers 114 will include many subsets 130 with each subset 130 having differing content identifier portions in common within the subset 130. Moreover, as will be further disclosed herein, FIG. 1 illustrates that the user 118 can seed the gallery 120 by issuing seed queries 132 which cause the search engine 106 to return seed query results 134.

FIG. 2 is an illustrative block diagram of a particular gallery 120 for query results 126. In the non-limiting gallery 120 illustrated by FIG. 2, the gallery 120 pertains to a category 202 of "all vehicles." Moreover, the gallery 120 includes various entries 204 pertaining to various subjects 112 sometimes with corresponding content identifiers 114. For instance, content identifiers 114-1 to 6 correspond to entries 204-1 to 6. Moreover, entry 204-7 corresponds to a collection of content identifiers 114-1 to 3 which the query component 106A of the search engine 106 returned as a query result 126 at some time. Thus, the term "entries" 204 encompasses both content identifiers 114 and query results 126 (and as will be disclosed further herein seed query results). As noted previously, when the query component 106A receives a user query 124, it determines which categories 202 are pertinent (to some degree) to the objective of the user query 124 and accesses the corresponding galleries 120. Furthermore, the query component 106A searches through the various entries 204 and determines which entries 204 pertain to the user query 124. The query component 106A returns these pertinent entries 204 to the user 118 as the query result 126 for the user query 124.

FIG. 2 also illustrates that a gallery 120 can be organized in a hierarchic fashion. More particularly, the gallery 120 illustrated by FIG. 2 is organized according to various levels 206-1 to 4 each relating to some organizational scheme associated with the category 202. While many such organizational schemes exist, FIG. 2 illustrates a non-limiting hierarchy in which the levels 206-1, 2, 3, and 4 correspond respectively to "all vehicles," vehicle manufacturers, divisions of the vehicle manufacturers, and models of various vehicles. Such hierarchic organizational schemes have been found to speed the delivery of query results 126 to the users 118. For instance, should a particular user 118 issue a user query 124 with an objective related to all vehicles, the query component 106A would typically return all entries 204 descending from the all vehicles level 206-1 of the gallery 120. Similarly, the search engine can return all entries 204-1 to 3 and 7 in response to a user query 124 with an objective related to division 1 of manufacturer 1.

However, it might be the case that the gallery 120 does not contain entries for all of the content identifiers 114 pertinent to some user query 124. For instance, FIG. 2 illustrates that no entries 204 currently exist in the gallery 120 for division 2 of manufacturer 1 and divisions 1 and N for manufacturer 2. Thus, should a user 118 issue a user query 124 for vehicles associated with these divisions, the query component 106A can search the network 102 to locate content identifiers 114 pertaining to these divisions. Otherwise, the query result 126 will likely be incomplete.

However, searching the network 102 will likely introduce delay into the delivery of the query result 126. Moreover, because the content identifiers 114 found in such a manner have not necessarily been verified as existing, and/or being accurate, the search engine 106 risks delivering inaccurate query results 126 in such circumstances. In contrast, because the entries 204 in the gallery have likely been in the gallery for some time and might even have been used without complaint, the entries 204 in the gallery 120 enjoy a greater probability of being both accurate and in existence.

In some embodiments, the gallery expansion component 106B seeds the gallery 120 with seed query results 134 with which it will expand the number of entries 204 in the gallery 120. More specifically, the gallery expansion component 106B seeds the gallery 120, determines a template 208 from the seed query results 134, and uses the template 208 to identify additional content identifiers 114 pertaining to subjects 112 already in the gallery 120 and/or otherwise likely related to the category 202 of the gallery 120. A user 118 often selects the seed query results 134 from entries 204 already in the gallery 120, from content identifiers 114 known to relate to a subject 112 that is either already represented in the gallery 120 or which the user 118 desires to be represented therein.

Accordingly, seed query results 134 resemble, and can be, content identifiers 114 or groups thereof. Typically, the user 118 selects between three (3) and ten (10) inclusive seed query results 134 with which to seed the gallery 120. Although, in some embodiments, the query engine 106 selects the seed query results 134 and/or some other number of seed query results 134 are selected.

Regardless of how many seed query results 134 are selected and which entity selects them, the seed query results 134 might contain some common combination of designations for roots, paths, directories, etc. through which content related to the subject 112 of the seed query results 134 is located. If not, the user 118 can seed the gallery 120 with additional seed query results 134 to increase the chances that some common portion of the seed query results 134 will exist.

Thus, the search engine 106 examines the seed query results 134 and determines the portion thereof that is common between a plurality thereof. The common portion of the seed query results 134 is herein deemed a "template" 208. It might also be worth noting that each of the pertinent seed query results 134 will also typically include a portion 210A indicative of the subject 112 of the seed query result 134 as well as other portions 210B thereof. If desired, a user (for instance, a gallery 120 or system administrator) can review the seed query results 134 and/or the template 208 before allowing the gallery expansion component 106B to proceed to verify that the gallery expansion component 106B is likely to expand the gallery 120 with satisfactory results.

The gallery expansion component 106B of some embodiments searches the set 128 (see FIG. 1) of content identifiers 114 on the network 102 to identify one or more subsets 130 thereof which also include the template 208 therein. Since these subsets 130 of content identifiers 114 include the template 208, it can be inferred that these content identifiers 114 identify content likely to be pertinent to one or more subjects 112 of the seed query results 134 and/or other subjects 112 belonging to, of, or in the category 202 of the gallery 120. It is also likely that the seed query results 134 will contain portions other than the template 208. For instance, the seed query results 134 might contain portion 210A identifying a subject 112 of some content and/or a subject 212 of a gallery 120. Moreover, the seed query results 134 might contain other portions 210B which may or may not pertain to organizing the subjects 112 and/or 212. For instance, a portion 210B might contain HTML (Hyper Text Protocol Language) features not particularly pertinent to any of the subjects 112 and 212 or otherwise pertinent to a gallery 120.

As a result, the gallery expansion component 106B can map these subsets 130 of content identifiers 114 into the gallery 120. More particularly, the gallery expansion component 106B can analyze the content identified by these subsets 130 of content identifiers 114 and determine the subjects 112 to which that content pertains. If the subjects 112 pertain to the category 202 of the gallery 120, the gallery expansion component 106B maps these content identifiers 114 to the gallery 120. In some embodiments, each of the individual content identifiers 114 of these subsets 130, the subsets 130 themselves, or some combination thereof can be mapped into the gallery 120 according to the subjects 112 to which they pertain. Thus, the gallery expansion component 106B expands the gallery 120 with the content identifiers 114 from the set 128 of content identifiers 114 on the network 102 which match, in whole or in part, the templates 208.

More particularly, some of the seed query results 134 might contain a particular path. Since that path will designate some logical portion of the network 102 it is likely that the content found along that path will have at least some common subject matter. Moreover, since users 118 and networks 102 often store content related to various subjects 112 categorically, it is likely that the templates 208 will point to categorical collections of content related to various subjects 112 within these categories. Furthermore, since galleries 120 can be organized hierarchically according to their categories 202 and the subjects 112 thereof, a significant likelihood exists that the content identifiers 114 in a subset 130 as identified by a template 208 in common will pertain to subjects 112 in the gallery 120.

In some cases it will occur that the template 208 happens to be associated with some element 214 of the hierarchic gallery 120 which either has no entries 204 or which might not have been identified as being pertinent to the gallery 120 (and therefore remains to be represented therein). See element 214 of FIG. 2 which happens to have been the original source for the template 208 in the subset 130 of content identifiers 114 (and the seed query results 134). That is, the element 214 might correspond to a website or other logical portion of the network 102. Thus, the content identifiers 114 associated therewith all share the common portion of the content identifiers 114 giving rise to the template 208. Thus, by seeding the gallery 120, the user 118 is able to detect and query these heretofore unidentified logical portions of the network 102. Therefore, since the selected seed query results 134 are unlikely to include every content identifier 114 associated with that heretofore unidentified element 214, expanding the gallery 120 to include (some or all of) the content identifiers 114 associated with that element 214 will likely expand the gallery 120 with content identifiers 114 pertinent to subjects 112 in (or that the user 118 desires to be in) the gallery 120.

At this juncture, a more specific and non-limiting set of seed query results 134 might further illustrate certain features of the disclosure. Thus, suppose that a particular user 118 possesses a desire to investigate various vehicles, the category 202 of a particular galley 120. That galley 120 might already include some entries 204 related to various vehicles which correspond to some of the subjects 112 of the gallery 120. However, it can be the situation that not enough entries 204 exist in the gallery 120 to provide query results 126 satisfactory to the particular user 118.

Thus, at some time, the user 118 (or the system 100) might determine that it is desirable to expand the gallery 120 to include additional entries 204. In some embodiments, knowing that Toyota Corollas, Audi A8s, and BMW X5s are types of vehicles, the user 118 issues a seed query 132 with an objective\ of "Toyota Corolla." The user might also issue another seed query 132 with an objective of "Audi A8." Additionally, the user 118 might issue yet another seed query 132 with an objective of "BMW X5".

In response to the seed queries 132, the gallery expansion component 106B (see FIG. 1) searches the set 128 of content identifiers 114 and returns those content identifiers 114-1 to 3 which are pertinent to the seed queries 132. Thus, the returned content identifiers 114-1 to 3 are deemed seed query results 134 and, in the current embodiment might respectively be:

http://www.kbb.com/kbb/newcars/photos/2008_toyota_corolla/, http://www.kbb.com/kbb/newcars/photos/2008_audi_a8/, and http://www.kbb.com/kbb/newcars/photos/2008_bmw_x5/.

In addition to returning the seed query results 134, the gallery expansion component 106B maps these seed query results 134 to the gallery 120. More particularly, the gallery expansion component 106B determines that a template 208 containing at least a portion of the text common between the seed query results 134 herein, "http://www.kbb.com/kbb/newcars/photos/2008_" exists within some (or in this case, all) of the individual content identifiers 114-1 to 3 of the collective seed query results 134. Moreover, the search engine 106 correlates the objectives of the foregoing seed queries 132 (i.e., "Toyota Corolla," Audi A8," and BMW X5") to (existing, new, or modified) subjects 112-1 to 3 of the gallery 120. Moreover, the gallery expansion component 106B adds these subjects 112-1 to 3 to the gallery 120, causes them to descend from appropriate manufacturers (or other entries at various levels 206 of the hierarchic gallery 120), and associates the individual seed query results 134 (and perhaps the collective seed query results 134) with their corresponding subjects 112-1 to 3. Moreover, the gallery expansion component 106B identifies the pertinent manufactures from the objectives of the seed queries 132 and adds or modifies appropriate manufacturers and divisions (or elements 214 at other levels 206) in the hierarchy of the gallery 120. More particularly, the gallery expansion component 106B can examine portions 210 of the seed query results 134 for subjects 112 or 212 and/or other pertinent information.

In summary of the foregoing illustrative discussion, the user 118 can seed the gallery 120 with known subjects 112 (here, for instance "Corolla") by issuing a seed user query 132 with a corresponding objective. The search engine 106 responds to the seed user query 132 by obtaining one or more pertinent content identifiers 114 from the set 128 of content identifiers 114 and expanding the gallery therewith. In some embodiments, the search engine 106 also returns the seed query results 134 to the user 118. Moreover, the search engine 106 extracts a template 208 from the seed query results 134 for further use in expanding the gallery 120 (as will now be further disclosed).

To further expand the gallery 120, the gallery expansion component 106B searches the set 128 of content identifiers 114 on the network 102 for additional content identifiers 114 which include all or a portion of the template 208. For instance, in the current embodiment, the search engine finds the following additional content identifiers 114-4 to 6 in the set 128:

http://www.kbb.com/kbb/newcars/photos/2008_toyota_prius, http://www.kbb.com/kbb/newcars/photos/2008_ford_f150, and http://www.kbb.com/kbb/newcars/photos/2008_volvo_xc70.

The search engine 106 expands the gallery with these additional content identifiers 114-4 to 6. Moreover, by analyzing these portions 210 in the additional content identifiers 114-4 to 6, the search engine 106 extracts the corresponding subjects 112-4 to 6 (here "Prius," "F150," and "XC70") from the additional content identifiers 114-4 to 6. Thus, the search engine 106 can also add/modify the additional subjects 112-4 to 6 in the gallery 120 and correlate the additional content identifiers 114-4 to 6 therewith in the expanded gallery 120. Similarly, the gallery expansion component 106B can discover the corresponding manufacturers (and/or other information) from these other portions 210 of the content identifiers 114-4-6 (and the content which they identify and/or locate).

As noted previously, the network 102 could be a LAN or an enterprise related WAN. Thus, in some embodiments, the set 128 of content identifiers 114 might be relatively limited having a membership of from a few to many thousands or millions of content identifiers 114. However, the disclosure is not limited to such relatively small applications. Instead, the disclosure encompasses scenarios in which the set 128 of content identifiers 114 includes hundreds of thousands, millions, billions, or even more content identifiers 114. For instance, the network could include the Internet (or be of a similar size) with many billions of content identifiers 114 without departing from the scope of the disclosure. Thus, the seed query results 134 and the additional content identifiers 114-4 to 6 thereof could include many content identifiers in numbers corresponding to the size of the network 102.

As a result, the gallery 120 can be expanded with large numbers of content identifiers 114 automatically by the use of a few seed queries 132. Galleries 120 expanded in such manners as those disclosed herein therefore will likely contain a more complete set of entries 204 than previously available galleries 120. Moreover, because the additional content identifiers 114-4 to 6 relate to seed queries 132 which can originate from known good, and, accurate sources on the network 102, such galleries will also likely produce more accurate query results 126 than heretofore possible. Moreover, because the search engine need not access the network 102 in responding to user queries 124, the system 100 of FIG. 1 will deliver query results more rapidly than heretofore available system. Some methods associated with systems 100 of various embodiments will now be disclosed with reference to FIGS. 3 and 4.

Figure 3:
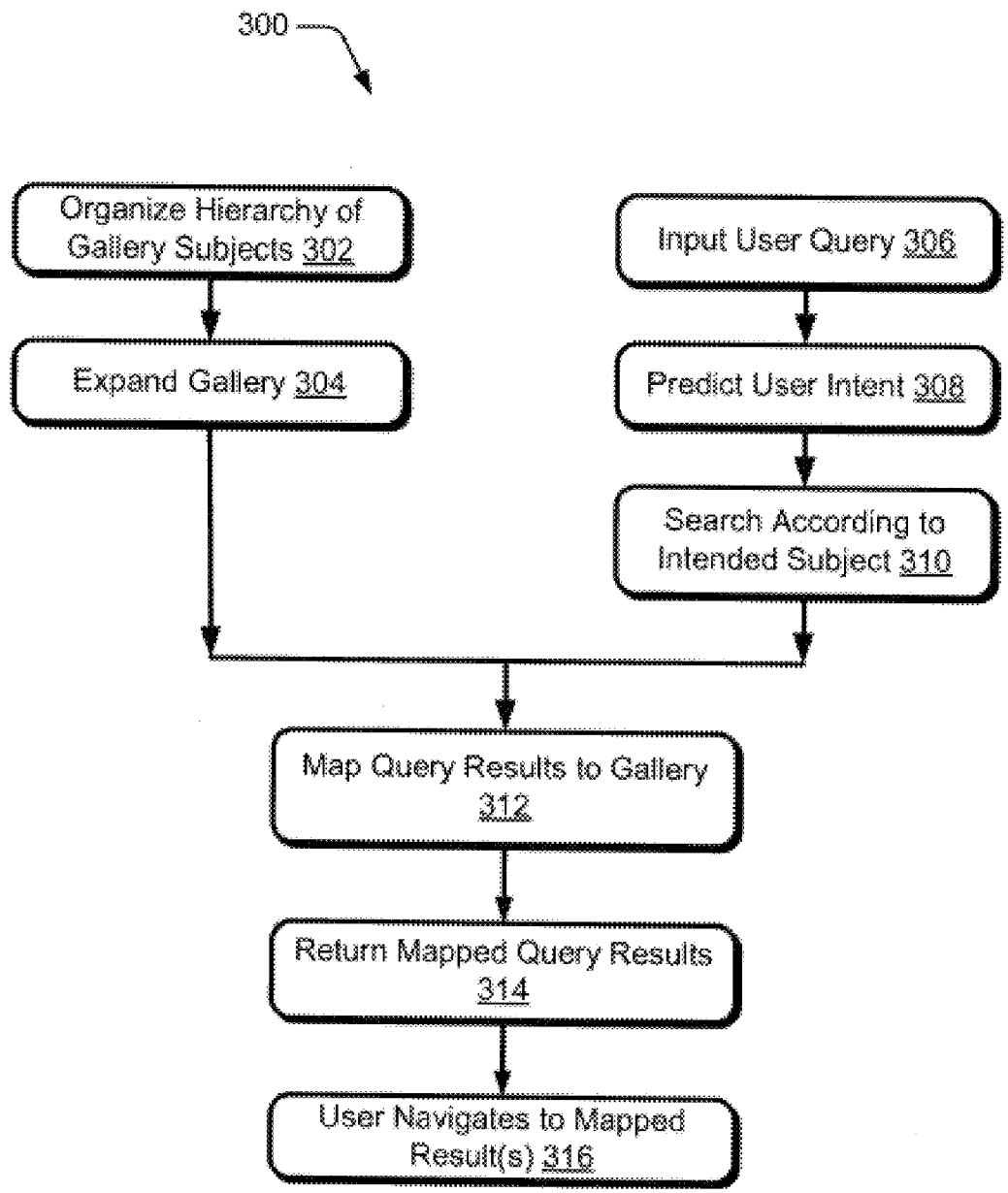
FIG. 3 is an illustrative flow chart depicting a method of conducting user queries on a network.

FIG. 3 is an illustrative flow chart depicting a method 300 of conducting user queries 124 on a network 102. In the method 300, a search engine 106 or other entity organizes a gallery 120 of various subjects 212 pertaining to a particular category 202 in step 302. Indeed, some search engines 106 organize the gallery 120 in a hierarchy fashion as suggested by the category 202 and the subjects 112 thereof. Moreover, some search engines 106 organize other galleries 120 and also organize the set of galleries in a hierarchy.

At some point, it might be deemed desirable to expand the gallery(s) 120 associated with the search engine 106. In which case, the gallery expansion component of the search engine 106 expands the gallery 120 thereby adding additional entries 204 to the gallery 120. See step 304. A method of expanding the gallery 120 is disclosed further with reference to FIG. 4 below.

With continuing reference to FIG. 3, and in step 306, a user submits a user query 124 to the search engine 106. The user query 124 includes terms which the user selects to identify the subject for which the user 118 wishes to receive information.

The search engine 106 responds to receiving the user query 124 by examining the terms identified by the user query 124 and predicting (based thereon) the subjects 112 in the gallery 120 for which the user 118 might have intended to receive information (i.e., content). See step 308.

Method 300 continues with the query component 106A of the search engine 106 examining the gallery 120 (as well as other galleries with pertinent categories 202) for subjects pertinent to the subject 112 intended by the user 118. In some situations, exact matches between the user intended subject 112 and the subjects 212 in the gallery(s) might not exist. Or, ambiguities might exist in the terms supplied by the user 118 to define the objective of the user query 124. Thus, the query component 106A of the search engine 106 can rank the subjects 212 (and associated content identifiers 114) available in the gallery 120. Moreover, the query component 106A can access the network 102 and search for additional content identifiers 114 which identify content pertinent to the user intended subject 112 of the user query 124. See step 310.

For those query results 126 not already in the gallery 120, the gallery expansion component 106B of the search engine 106 maps these query results 126 to the appropriate subjects 212 and, as desired, adds/modifies subjects 212 and elements 214 in the gallery 120. See step 312. Moreover, the gallery expansion component 106B can determine a confidence level associated with each of the query results 126 and, depending thereon, perform the mapping of the query results 126 to the gallery 120.

At some point, method 300 also includes returning the query results 126 (with or without the confidence levels) to the user 118. See step 314.

As desired, at step 316, the user 118 navigates to one or more of the query results 126. Moreover, the query component 106A can record whether the user 118 navigates to the various query results 126 and collect metrics associated with such activities. Thus, the query component 106A can also adjust the confidence level(s) of the query results 126 according to post-search user 118 activities.

Figure 4:
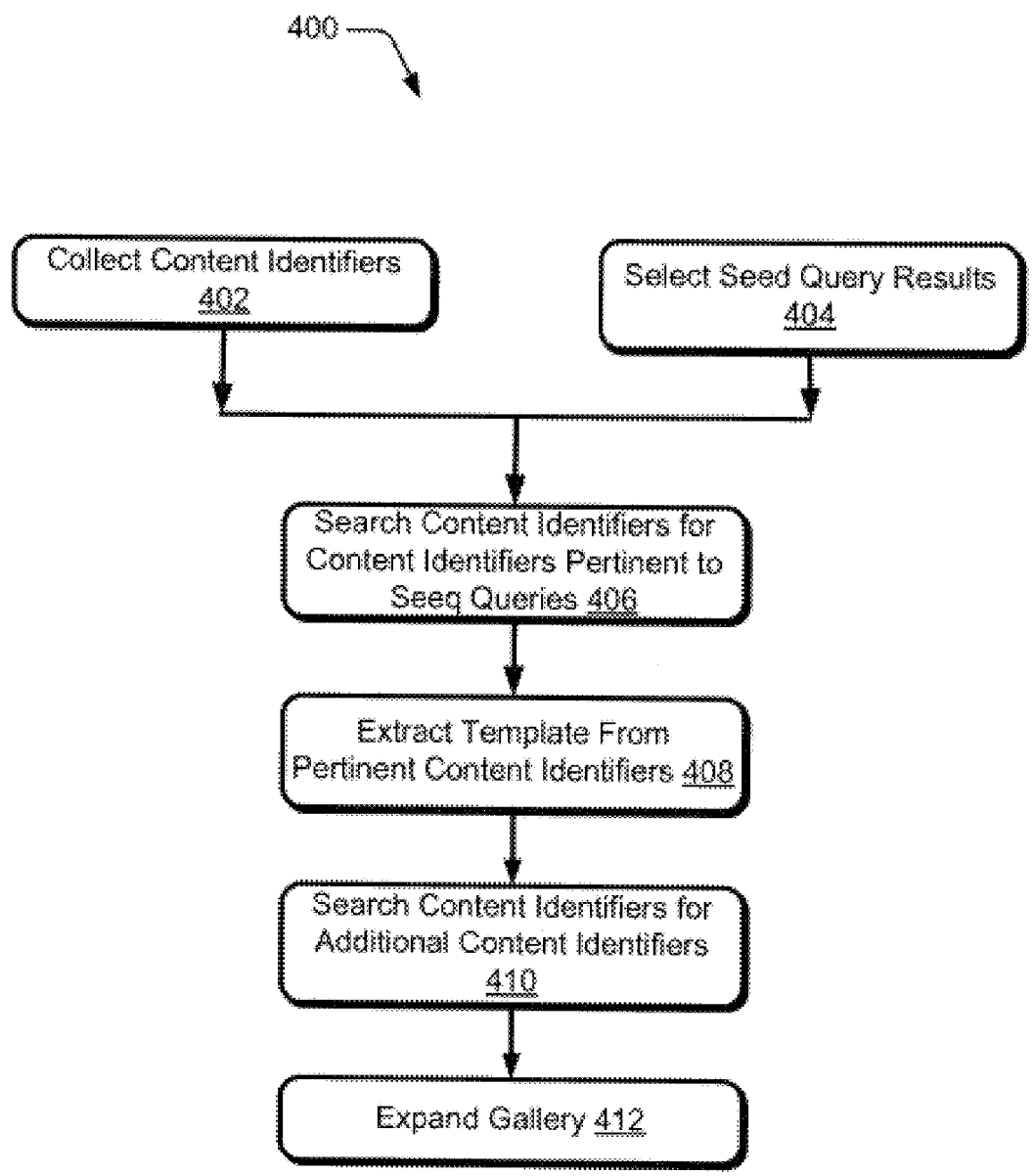
FIG. 4 is an illustrative flow chart depicting a method of expanding a gallery of query results.

FIG. 4 is an illustrative flow chart depicting a method 400 of expanding a gallery 120 of query results 126. In step 402 of the method 400, the gallery expansion component 106B of the search engine 106 accesses the network 102 and obtains the set 128 of content identifiers 114 available thereon. Additionally, or in the alternative, the gallery expansion component 106B examines the gallery 120 to obtain and add to the set 128 of content identifiers 114.

The gallery expansion component 106B (or the user 118) also selects seed queries 132. These seed queries 132 can be selected based on areas of the gallery 120 which the search engine 106 determines to contain relatively few subjects 112 and/or entries 204 if any. Thus, the seed queries 132 can be selected to fill certain areas of the gallery 120. Moreover, some seed queries 132 can be based on, or duplicates of, user queries 124 received from the user 118. In any case, a set of seed queries 132 is selected with which to expand the gallery 120. See step 404.

In step 406 of method 400, the gallery expansion component 106B searches the set 128 of content identifiers 114 for content identifiers 114 pertinent to the seed queries 132.

The gallery expansion component 106B extracts, from the content identifiers 114 pertinent to the seed queries 132, a template(s) 208 to be used for identifying additional content identifiers 114 for the gallery 120. See step 408.

Using the template 208, the gallery expansion component 106B again searches the set 128 of content identifiers 114 for additional content identifiers 114 pertinent to subjects 112 of the gallery 120 or that could be included therein. See step 410.

In step 412, the gallery expansion component 106B expands the gallery 120 with the pertinent content identifiers 114 and/or the corresponding subjects 212.

Thus, various embodiments provide expanded galleries of query results and methods and systems for expanding galleries of query results. The expanded galleries provided thereby allow search engines to provide more complete and accurate results in more timely fashions than heretofore possible. Additionally, embodiments provide methods of expanding galleries with little, or no, user intervention. Moreover, embodiments expand galleries based on actual user queries thereby allowing user activity to influence which portions of the galleries are expanded. Accordingly, pertinent subjects of the galleries are identified earlier and expanded by such embodiments.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
a memory device;
one or more processors communicatively coupled to the memory;
an image gallery maintained in the memory device and configured to store query results which are related to a category in the memory device, the image gallery being organized according to subjects corresponding to the query results, a plurality of gallery entries including at least one content identifier and at least one query result;
a query component stored in the memory device and executable by the one or more processors that is configured to:
receive a query from a user and identify a subject of the user query,
predict a user intended subject for the user query from the identified subject, and
output any gallery entries related to the user intended subject; and
a gallery expansion component stored in the memory and executable by the one or more processors that is configured to:
in response to determining that insufficient gallery entries exist in the image gallery that is maintained in the memory device,
seed the image gallery with a plurality of seed query results,
determine a portion that is common among a subset of the plurality of seed query results and render the common portion of the subset of the plurality of seed query results as a template, the common portion comprising a common root, directory or path for respective content of the subset of the plurality of seed query results, search a set of content identifiers of content on a network to identify a subset of the content identifiers that include the template of the subset of the plurality of seed query results, the set of the content identifiers comprising uniform resource locators (URLs) that provide logical locations of the content on the network, analyze content of the identified subset of the content identifiers and determine one or more subjects to which the content of the identified set of the content identifiers belongs, and expand the image gallery with the identified subset of the content identifiers by mapping the identified subset of the content identifiers to the image gallery according to the determined one or more subjects to which the content of the identified set of the content identifiers belongs.

2. The system of claim 1 wherein the gallery expansion component is further configured to:

determine a confidence level regarding whether a subject associated with one of the identified subset of the content identifiers belongs to the category of the image gallery; and responsive to the determined confidence level, expanding the image gallery with the one of the identified subset of the content identifiers.

3. The system of claim 1 wherein the query component is further configured to map a result of another user query to one of the identified subset of the content identifiers in the expanded image gallery.

4. The system of claim 1 wherein the query component is further configured to predict that one of the identified subset of the content identifiers meets the user intended subject and return the one of the identified subset of the content identifiers responsive to the user query.

5. The method of claim 1 wherein the gallery entries are organized in the image gallery in a hierarchy according to the subjects corresponding to the query results.

6. A method comprising:

under control of one or more processors configured with executable instructions:

seeding an image gallery of query results with a plurality of seed query results, each seed query result identifying a subject in a category of the image gallery and representing a content identifier providing a logical location on a network where content associated with respective seed query result is located, wherein the image gallery is maintained in a memory device;

determining a template associated with a subset of the plurality of seed query results, the determined template representing a common portion shared by the subset of the plurality of seed query results;

searching a set of content identifiers of content that are accessible through the network to determine a subset of the set of content identifiers in which each member of the subset includes the determined template associated with the subset of the plurality of seed query results;

searching the set of content identifiers to identify additional members of the set of content identifiers, each of the additional members identifying a respective subject in the category of the image gallery; and expanding the image gallery with the additional members of the subset of content identifiers by mapping the additional members to the image gallery based on respective identified subjects of the additional members.

7. The method of claim 6 further comprising determining a confidence level regarding whether a subject associated with one of the additional members belongs to the category of the image gallery and responsive to the determined confidence level, expanding the image gallery with the one of the additional members.

8. The method of claim 6 further comprising mapping a result of a user query to one of the additional members in the expanded image gallery.

9. The method of claim 6 further comprising using a result of a user query as a seed query result.

10. The method of claim 6 further comprising predicting that one of the additional members meets the intent of a user query and returning the one of the additional members responsive to the user query.

11. The method of claim 6 further comprising using a data mining technique to determine the template.

12. The method claim 6 wherein the content identifiers are uniform resource locators (URLs).

13. The method of claim 6 wherein the network is a wide area network of an enterprise.

14. The method of claim 6 wherein the seed query results include between 3 and 10 seed query results.

15. The method of claim 6 wherein the seed query results are identified based on user selection.

16. The method of claim 6 wherein the image gallery organizes the content identifiers and query results in a hierarchy according to the subjects.

17. One or more hardware media storing instructions that are executable by a computing device, causing the computing device to perform acts comprising:

seeding an image gallery for a network with a plurality of content identifiers of content, the plurality of content identifiers providing logical locations on the network where respective content is located, wherein the image gallery is maintained in a memory device;

determining a template from a subset of the plurality of content identifiers, the determined template representing a common portion among the subset of the plurality of content identifiers and comprising a common root, a common directory and/or a common path;

searching a set of content identifiers to identify one or more members of the set of content identifiers that include the determined template; and expanding the image gallery with the one or more members of the set of content identifiers, the expanding comprising:

determining a respective subject associated with each one of the one or more members of the set of content identifiers, and adding each one of the one or more members of the set of content identifiers to the image gallery based on the respective determined subject.

18. The one or more hardware media of claim 17 wherein the acts further comprise:

determining a respective confidence level regarding whether the respective subject associated with each one of the one or more members of the set of content identifiers belongs to a category of the image gallery, and responsive to the respective determined confidence level, expanding the image gallery with each one of the one or more members of the set of content identifiers.

19. The one or more hardware media of claim 17 wherein the acts further comprise mapping a result of a user query to one of the one or more members in the expanded image gallery.

20. The one or more hardware media of claim 17 wherein the acts further comprise predicting that one of the one or more members meets an intent of a user query and returning the one of the one or more members responsive to the user query.

* * * * *